(12) United States Patent
Bhaskar

(10) Patent No.: US 8,064,440 B2
(45) Date of Patent: Nov. 22, 2011

(54) TECHNIQUE FOR AVOIDING IP LOOKUP WITH MULTIPOINT-TO-MULTIPOINT LABEL SWITCHED PATHS

(75) Inventor: Nidhi Bhaskar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 427 days.

(21) Appl. No.: 11/499,557

(22) Filed: Aug. 4, 2006

(65) Prior Publication Data
US 2008/0123650 A1    May 29, 2008

(51) Int. Cl.
H04L 12/28 (2006.01)
H04L 12/56 (2006.01)

(52) U.S. Cl. ............. 370/389; 370/395.5; 370/395.53; 370/390

(58) Field of Classification Search ............ 370/395.5, 370/395.53, 389, 390
See application file for complete search history.

(56) References Cited

U.S. PATENT DOCUMENTS

| | | | |
|---|---|---|---|
| 6,049,546 A * | 4/2000 | Ramakrishnan | 370/412 |
| 6,055,364 A | 4/2000 | Speakman et al. | |
| 6,353,596 B1 * | 3/2002 | Grossglauser et al. | 370/256 |
| 6,389,475 B1 | 5/2002 | Speakman et al. | |
| 6,684,331 B1 | 1/2004 | Srivastava | |
| 6,721,290 B1 * | 4/2004 | Kondylis et al. | 370/329 |
| 6,765,892 B1 | 7/2004 | Leung et al. | |
| 6,765,921 B1 * | 7/2004 | Stacey et al. | 370/401 |
| 6,839,348 B2 | 1/2005 | Tang et al. | |
| 6,847,638 B1 | 1/2005 | Wu et al. | |
| 6,879,594 B1 * | 4/2005 | Lee et al. | 370/408 |
| 6,885,677 B1 * | 4/2005 | Klevans | 370/466 |
| 7,016,351 B1 | 3/2006 | Farinacci et al. | |
| 7,079,504 B1 | 7/2006 | Leung et al. | |
| 7,139,278 B2 * | 11/2006 | Gibson et al. | 370/401 |
| 7,151,775 B1 * | 12/2006 | Renwick et al. | 370/400 |
| 7,310,685 B2 * | 12/2007 | Basso et al. | 709/242 |
| 7,558,219 B1 * | 7/2009 | Aggarwal et al. | 370/256 |
| 7,680,923 B1 * | 3/2010 | Allan | 709/224 |
| 2001/0019554 A1 * | 9/2001 | Nomura et al. | 370/389 |
| 2002/0165980 A1 * | 11/2002 | Brown | 709/242 |
| 2003/0031192 A1 * | 2/2003 | Furuno | 370/409 |
| 2003/0056007 A1 * | 3/2003 | Katsube et al. | 709/238 |

(Continued)

OTHER PUBLICATIONS

Wang, Ning. George Pavlou. "Towards Dynamic Access Control for Bi-directional Multicast Trees". IEEE, 2001.*

(Continued)

*Primary Examiner* — Daniel J Ryman
*Assistant Examiner* — Andrew Oh
(74) *Attorney, Agent, or Firm* — Cesari and McKenna, LLP

(57) ABSTRACT

A technique avoids Internet Protocol (IP) lookup with Multipoint-to-Multipoint (MP2MP) Label Switched Paths (LSPs) in a computer network. According to the novel technique, end nodes of an MP2MP LSP determine a root node of the MP2MP LSP for a particular IP stream, e.g., based on a rendezvous point (RP) of the IP stream. The root node of the MP2MP LSP allocates an inner-label for the particular IP stream, and informs each of the end nodes of the inner-label for that stream. When any one of the end nodes thereafter sources traffic for the particular IP stream, the sourced traffic contains the allocated inner-label for the stream. Upon receiving the traffic for the particular IP stream, an end node may determine the IP stream to which the received traffic belongs based on the MP2MP LSP (e.g., indicated by an outer-label) and the inner-label, i.e., without performing an IP lookup operation.

20 Claims, 5 Drawing Sheets

U.S. PATENT DOCUMENTS

| | | | |
|---|---|---|---|
| 2003/0076854 A1* | 4/2003 | Mudhar et al. | 370/432 |
| 2003/0193958 A1* | 10/2003 | Narayanan | 370/400 |
| 2004/0028064 A1* | 2/2004 | Cetin et al. | 370/409 |
| 2004/0151181 A1* | 8/2004 | Chu et al. | 370/392 |
| 2004/0162871 A1* | 8/2004 | Pabla et al. | 709/201 |
| 2004/0205215 A1 | 10/2004 | Kouvelas | |
| 2005/0027782 A1* | 2/2005 | Jalan et al. | 709/200 |
| 2005/0063411 A1* | 3/2005 | Wang et al. | 370/437 |
| 2005/0094554 A1* | 5/2005 | Nakash | 370/222 |
| 2005/0154790 A1* | 7/2005 | Nagata et al. | 709/223 |
| 2005/0169266 A1* | 8/2005 | Aggarwal et al. | 370/389 |
| 2005/0188106 A1* | 8/2005 | Pirbhai et al. | 709/238 |
| 2005/0271035 A1* | 12/2005 | Cohen et al. | 370/351 |
| 2006/0221958 A1* | 10/2006 | Wijnands et al. | 370/389 |
| 2007/0135168 A1* | 6/2007 | Liu | 455/562.1 |
| 2007/0263535 A1* | 11/2007 | Shabtay | 370/230 |

OTHER PUBLICATIONS

Lasserre, Marc. "Transparent VLAN Services over MPLS". IETF, May 2002.*

Sajassi, Ali. "VPLS based IP Multicast". Cisco Systems, Nov. 2002.*

Reliance Infocomm. "Do's and Don't's of Building a Large Metro Ethernet Network". Feb. 2004.*

Perlman, R., Interconnections Second Edition: Bridges, Routers, Switches, and Internetworking Protocols, Section 1.1, Addison Wesley Longman, Inc., 1999, pp. 1-7.

Thomas, Stephen A., IP Switching and Routing Essentials: Understanding RIP, OSPF, BGP, MPLS, CR-LDP, and RSVP-TE, Chapter 7, John Wiley & Sons, Inc., 2002, pp. 221-243.

Wijnands, I., et al., Multicast Extensions for LDP (draft-wijnands-mpls-ldp-mcast-ext-00.txt), Network Working Group Internet Draft, Mar. 2005, pp. 1-12.

Mannie, E., et al., Generalized Multi-Protocol Label Switching (GMPLS) Extensions for Synchronous Optical Network (SONET) and Synchronous Digital Hierarchy (SDH) Control, Network Working Group Request for Comments 3946, Oct. 2004, pp. 1-25.

Mannie, E., Generalized Multi-Protocol Label Switching (GMPLS) Architecture, Network Working Group Request for Comments 3945, Oct. 2004, pp. 1-65.

Cain, B., et al., Internet Group Management Protocol, Version 3, Network Working Group Request for Comments 3376, Oct. 2002, pp. 1-50.

Bhaskar, N., et al., Bootstrap Router (BSR) Mechanism for PIM (draft-ietf-pim-sm-bsr-09.txt), Internet Engineering Task Force Internet Draft, Jun. 2006, pp. 1-40.

Estrin, D., et al., Protocol Independent Multicast—Sparse Mode (PIM-SM): Protocol Specification, Jun. 1998, pp. 1-62.

Fenner, B., et al., Protocol Independent Multicast—Sparce Mode (PIM_SM): Protocol Specification (Revised), Sep. 2006, pp. 1-129.

Minei, I., et al., Label Distribution Protocol Extensions for Point-to-Multipoint and Multipoint-to-Multipoint Label Switched Paths, Jun. 2005, pp. 1-23.

* cited by examiner

| MP2MP LSP 1 (CONTEXT) 405 ||
|---|---|
| INNER-LABEL 410 | IP STREAM 415 |
| "L 100" | G1 |
| "L 200" | G2 |
| ⋮ | ⋮ |

LABEL-SPACE/TABLE 400

ENTRIES 420

FIG. 4

TECHNIQUE FOR AVOIDING IP LOOKUP WITH MULTIPOINT-TO-MULTIPOINT LABEL SWITCHED PATHS

BACKGROUND OF THE INVENTION

1. Field of the Invention

The present invention relates to computer networks and more particularly to avoiding Internet Protocol (IP) lookup with Multipoint-to-Multipoint (MP2MP) Label Switched Paths (LSPs) in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

The data packets transferred among the network nodes may include fixed-sized data cells and/or variable-sized data frames. Each data packet typically comprises "payload" data prepended ("encapsulated") by at least one network header formatted in accordance with a network communication protocol. The network headers include information that enables the client nodes and intermediate network nodes, such as routers, to route the packet efficiently through the computer network. Often, a packet's network headers include at least a data-link (layer 2) header and an internetwork (layer 3) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

In operation, a network node may send a data packet to a network interface of an intermediate network node. Thereafter, the intermediate network node receives the packet and forwards the packet to its next destination. For example, the intermediate is network node may perform a layer-2 switching function that simply re-directs the packet from one network interface to another based on the contents of the packet's data-link header. Alternatively, the intermediate network node may perform a layer-3 routing function, or forwarding decision, that selects the most appropriate network interface to forward the packet based on the contents of the packet's internetwork header.

A source node (sender) may be configured to transfer a unidirectional stream of data packets, or a "data flow," to a destination node (receiver) in a data network. The data stream is unidirectional in that data travels one-way from the sender to the receiver. The logical procession of intermediate network nodes that transmit and receive data packets from the sender to the receiver defines the data stream's data path. A first node that is nearer the receiver in the data stream's data path than a second node in the stream is said to be "downstream" from the second node. Likewise, a first node that is nearer the sender in the data stream's path than a second node in the stream is said to be "upstream" from the second node.

"Unicast" data transfer (i.e., unicast forwarding) involves forwarding a data packet from a single process of an end node ("source") to a single process of an end node ("receiver") on the computer network. Often the destination of the data packet issued by a source may be more than one, but less than all of the receivers on the network. This type of "multicast" data transfer (i.e., multicast forwarding) is typically employed to segregate communication between groups of receivers on the network. IP multicasting, in particular, may be used to disseminate data to a large group of receivers on the network.

To effect IP multicasting, the source generally specifies a destination IP address that is a multicast group address for the message and, as such, can only represent receivers of packets. The IPv4 (or IPv6) address range is subdivided into different prefixes, one of which is designated for use by IP multicast. Receivers typically notify their communication software of their desire to receive messages destined for the multicast group address; this is called "joining a multicast group." These receiving members then "listen" on the multicast address and, when a multicast message is received at a receiver, it delivers a copy of the message to each process that belongs to the group.

IP multicasting relies on (i) a group management protocol to establish and maintain local multicast group membership, and (ii) multicast routing protocols to route packets efficiently, such as, e.g., Protocol Independent Multicast (PIM). The Internet Group Management Protocol (IGMP) manages packet communication between end nodes, e.g., hosts, and their local intermediate network node, e.g., multicast router, letting them join or leave groups. That is, IGMP is used to send a group membership message from a host to its directly connected router, indicating that the host wants to join a group (address) as a receiver. Note that IGMP is an IPv4 group membership protocol; the conventional Multicast Listener Discovery (MLD) protocol is substantially similar to, and performs the same functions as, IGMP, but for IPv6. When group membership is established, multicast packets (identified by a multicast source (S) and group (G) address in the destination address field of an IP header, or an "(S,G)" address) are forwarded between routers using multicast routing protocols. IGMP is described in RFC 3376, entitled *Internet Group Management Protocol, Version* 3, by Cain et al., October 2002, the contents of which are hereby incorporated by reference as though fully set forth herein.

In certain IP multicast networks, a single node or router acts as a meeting place for sources and receivers of multicast data. In other words, IP multicast packets from an upstream source and join messages from downstream routers "rendezvous" at this core router, or "Rendezvous Point" (RP). An RP may be configured to know the sources (S) for all multicast groups (G) of the IP multicast network. That is, by using an RP, other routers of the IP multicast networks are not required to know the addresses of the sources or every multicast group, but instead only the address of the RP. When a router (an end point) learns that an interested receiver wishes to join a particular group, the router will attempt to join the group at the RP, not to the actual source of the content. Thus, rather than the (S,G) notation above, the RP model utilizes a "(*,G)" notation, in which any source (*) may be used for a given group (G), i.e., multiple sources may source multicast traffic for the same group. The use of RPs and multicasting generally is further described in RFC 2362, entitled *Protocol Independent Multicast-Sparse Mode (PIM-SM): Protocol Specification*, by Estrin et al., June 1998, and in the Internet Draft by Fenner et al., entitled *Protocol Independent Multicast-Sparse Mode (PIM-SM): Protocol Specification (Revised)* <draft-ietf-pim-sm-v2-new-12.txt>, Internet Draft, March 2006, the contents of both which are hereby incorporated by reference as though fully set forth herein.

RPs for an IP multicast network may be determined using either manual configuration (e.g., a system administrator manually configures the RP at each router), or dynamic configuration. One example of a dynamically configured RP is an "Auto-RP" protocol (a proprietary protocol of Cisco Systems, Inc.), which automatically distributes information to routers that identifies the RP address for various multicast groups. Specifically, potential RPs announce themselves to a "mapping agent," which resolves any conflicts from the potential RPs. The mapping agent then sends out the multicast group RP mapping information to the other routers, which are listening for this RP information (e.g., using pre-configured group addresses). Alternatively, a non-proprietary dynamic RP configuration method involves the use of a "bootstrap router" (BSR), which operates in a similar manner to the mapping agent of Auto-RP. In particular, a single BSR may be selected based on one or more configured policies. Potential RP candidates may announce themselves to the BSR, which then elects the RP based on the candidates. The use of a BSR is further described in the Internet Draft by Bhaskar et al., entitled *Bootstrap Router (BSR) Mechanism for PIM* <draft-ietf-pim-sm-bsr-09.txt>, Internet Draft, June 2006, the contents of which are hereby incorporated by reference as though fully set forth herein.

A virtual circuit may be used to define a logical end-to-end data path between two or more network nodes (e.g., participating in virtual private network, "VPN"). The virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network. Notably, when the two or more nodes are located in different routing domains, devices in a plurality of interconnected routing domains may cooperate to establish the nodes' virtual circuit.

MPLS enables network nodes to forward packets along predetermined "label switched paths" (LSPs). Each LSP defines a logical data path, or virtual circuit, between a pair of source and destination nodes; the set of network nodes situated along the LSP may be determined using reachability information provided by conventional interior gateway protocols, such as OSPF, IS-IS, etc. Unlike traditional IP routing, where node-to-node ("next hop") forwarding decisions are performed based on destination IP addresses, MPLS-configured nodes instead forward data packets based on "label" values (or "tag" values) added to the IP packets. As such, an MPLS-configured node can perform a label-lookup operation to determine a packet's next-hop destination. MPLS Traffic Engineering (TE) provides additional advantages over IP-based routing, such as enabling MPLS-configured nodes to reserve network resources, such as bandwidth, to ensure a desired quality of service (QoS).

Each destination represented via an LSP is associated with a locally allocated label value at each hop of the LSP, such that the locally allocated label value is carried by data packets forwarded over its associated hop. The MPLS label values are typically distributed among the LSP's nodes using, e.g., the Label Distribution Protocol (LDP), Resource Reservation Protocol (RSVP) or Multiprotocol (MP)-BGP protocol. Operationally, when a data packet is received at an MPLS-configured node, the node extracts the packet's transported label value, e.g., stored at a known location in the packet's encapsulating headers. The extracted label value is used to identify the next network node to forward the packet. Typically, an IGP label determines the packet's next hop within a routing domain, and a VPN label determines the packet's next hop across routing domains. More generally, the IGP label may be an MPLS label or any other encapsulation header used to identify the packet's next hop in the routing domain.

The packet may contain a "stack" of labels such that the stack's top-most label (i.e., an "outer-label") determines the packet's next-hop destination. After receiving the packet, the MPLS-configured node "pops" (removes) the packet's top-most label from the label stack and performs a label-lookup operation to determine the packet's next-hop destination. Then, the node "pushes" (inserts) a new label value associated with the packet's next hop onto the top of the stack and forwards the packet to its next destination. This process is repeated for every logical hop along the LSP until the packet reaches its destination node. The above-described MPLS operation is described in more detail in Chapter 7 of the reference book entitled *IP Switching and Routing Essentials*, by Stephen Thomas, published 2002, which is hereby incorporated by reference as though fully set forth herein.

LSPs may be used to carry traffic from multiple IP streams that are demultiplexed at downstream end nodes of the LSP. A receiving end node (i.e., the destination of the LSP) receives the traffic, and may perform an "IP lookup" operation, e.g., into a forwarding/routing table, to determine where to forward the traffic based on the destination address of the traffic previously encapsulated in the LSP. The end node may then forward the traffic to the appropriate destination (i.e., without the LSP labels). Because an IP lookup may consume time and/or resources, an efficient advance has been made to utilize an "inner-label" that corresponds to a particular IP stream. Specifically, an upstream source of a particular IP stream on the LSP (e.g., an end/root node) may allocate a specific inner-label that corresponds to the particular IP stream. A receiving LSP end node may then use the inner-label to determine to which IP stream the received data belongs. By doing so, the receiving LSP end node may forward the traffic to an appropriate destination (or destinations) accordingly without the need for an IP lookup. Notably, the inner-label may be based on a context provided by the outer-label for the LSP if multiple LSPs end at the receiving end node, as will be understood by those skilled in the art.

Conventional LSPs are established between a source end node and a destination end node, i.e., "point-to-point" (P2P) LSPs. Multipoint LSPs, on the other hand, may be employed that connect one or more source end points to one or more destination end points, e.g., along a shared tree. These multipoint LSPs may be used in a manner similar to (and may complement) IP multicast, with packet replication at various LSRs of the shared tree, as will be understood by those skilled in the art. Notably, extensions to LDP are further described in the Internet Draft by Minei et al., entitled *Label Distribution Protocol Extensions for Point-to-Multipoint and Multipoint-* to-Multipoint Label Switched Paths <draft-ietf-mpls-ldp-p2mp-01>, dated June 2005 and in the Internet Draft by Wijnands et al., entitled *Multicast Extensions for LDP* <draft-wijnands-mpls-ldp-mcast-ext-00. txt>, dated March 2005, the contents of both of which are hereby incorporated by reference as though fully set forth herein. "Point-to-Multipoint" (P2MP) LSPs, for example, have one source end node to source traffic onto the P2MP LSP, and multiple destination end nodes to receive the traffic from the P2MP LSP. As mentioned above, the upstream source end (root) node may allocate an inner-label for sourced IP stream traffic, such that each of the destination end nodes may uniquely identify a received IP stream based on the upstream-allocated inner-label and forward the corresponding traffic without performing an IP lookup.

"Multipoint-to-Multipoint" (MP2MP) LSPs, on the other hand, may have multiple source end nodes to source traffic onto the MP2MP LSP, and multiple destination end nodes to receive the traffic from the MP2MP LSP. Thus, an MP2MP LSP utilizes a bi-directional tree, in which each end node may either source or receive traffic, e.g., for various IP streams. (For instance, a multicast group utilizing MP2MP LSPs may employ the (*,G) source-independent notation.) One problem associated with using upstream-allocated inner-labels with MP2MP LSPs, however, is that there may be more than one source for a particular group that is sourcing traffic for an IP stream onto the MP2MP LSP. According to the upstream-allocated inner-label technique, each upstream source of the MP2MP LSP may allocate its own inner-label, which may be different from other sources' inner-labels. Accordingly, any end node receiving traffic for the IP stream on the MP2MP LSP will be unable to use the inner-labels effectively since it does not know to which source the inner-label belongs, and, unfortunately, may be required to perform an inefficient IP lookup operation. There remains a need, therefore, to avoid IP lookup with MP2MP LSPs.

SUMMARY OF THE INVENTION

The present invention is directed to a technique for avoiding Internet Protocol (IP) lookup with Multipoint-to-Multipoint (MP2MP) Label Switched Paths (LSPs) in a computer network. According to the novel technique, end nodes of an MP2MP LSP determine a root node of the MP2MP LSP for a particular IP stream, e.g., based on a rendezvous point (RP) of the IP stream. The root node of the MP2MP LSP allocates an inner-label for the particular IP stream, and informs each of the end nodes of the inner-label for that stream. When any one of the end nodes thereafter sources traffic for the stream, the sourced traffic contains the allocated inner-label for the IP stream. Upon receiving the traffic for the particular IP stream, an end node may determine the particular IP stream to which the received traffic belongs based on the MP2MP LSP (e.g., indicated by an outer-label) and the inner-label, i.e., without performing an IP lookup operation.

Advantageously, the novel technique avoids IP lookup with MP2MP LSPs in a computer network. By ensuring that each possible source node of the IP stream on the MP2MP LSP utilizes the same inner-label, the novel technique allows the receiving end nodes to determine the IP stream to which the received traffic belongs based on the unique inner-label for that LSP (i.e., regardless of the source). In particular, the present invention extends the concept of upstream-allocated inner-labels for point-to-multipoint (P2MP) LSPs for use with MP2MP LSPs by creating a mechanism through which all source nodes share the same unique inner-label for the IP stream on the MP2MP LSP, which is known by all the receiving end nodes. Further, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 4 is a schematic block diagram of an exemplary label-space/table that may be advantageously used with the present invention.

DETAILED DESCRIPTION OF AN ILLUSTRATIVE EMBODIMENT

Figure 1:
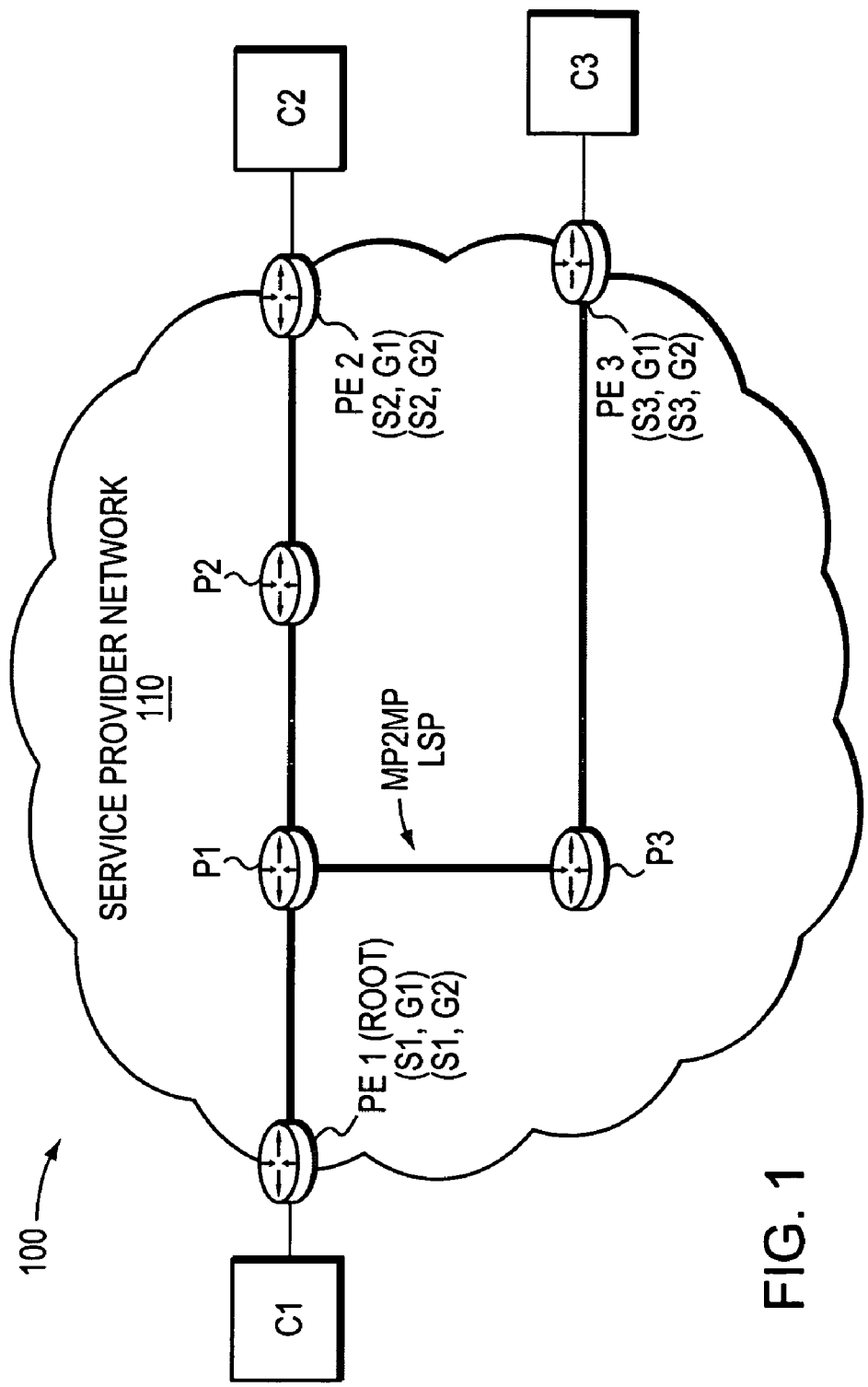
FIG. 1 is a schematic block diagram of an exemplary computer network that may be used in accordance with the present invention.

FIG. 1 is a schematic block diagram of an exemplary computer network 100 that may be advantageously used with the present invention. The network 100 comprises a service provider (SP) network 110 (e.g., an Internet SP, "ISP") having a plurality of provider edge (PE) devices PE1-PE3 interconnected by zero or more provider (P) devices (e.g., core devices) P1-P3 as shown. Illustratively, the devices of the SP network may be interconnected by one or more links, such as, e.g., over wide area network (WAN) links, local area network (LAN) links, etc., to form the service provider network 110. Also, in accordance with the present invention, one or more of the devices of the SP network are configured for multicast services, as will be understood by those skilled in the art, such that the service provider network is a multicast network. Computer network 100 also comprises one or more customer devices C1-C3, such as, e.g., content providers or receivers. Those skilled in the art will understand that any number of nodes, links, devices, etc., may be used in the computer network 100 and connected in a variety of ways, and that the view shown herein is for simplicity.

Data packets may be exchanged among the devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
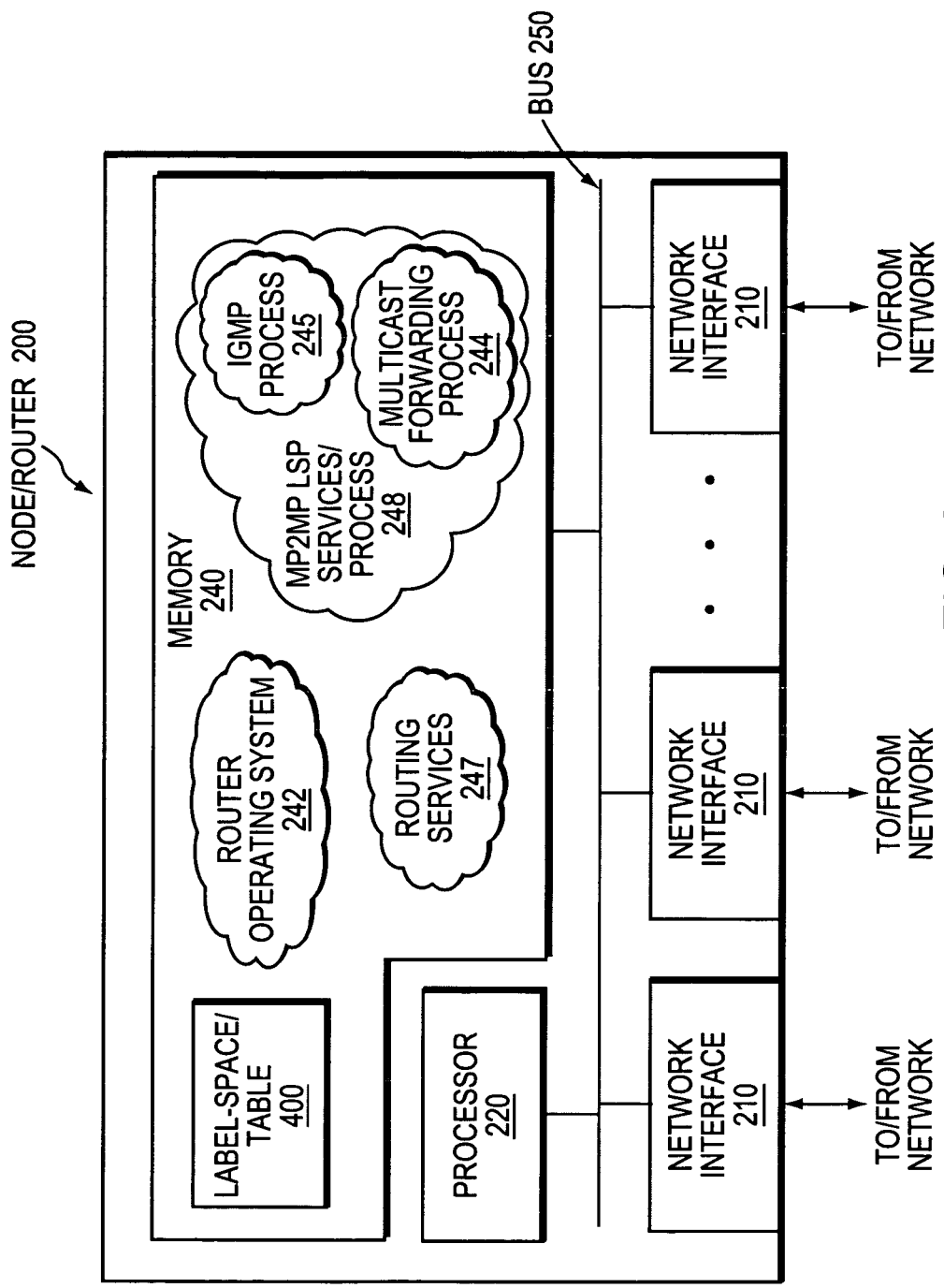
FIG. 2 is schematic block diagram of an exemplary router that may be advantageously used with the present invention.

FIG. 2 is a schematic block diagram of an exemplary node 200, which is illustratively a router that may be advantageously used with the present invention, e.g., as a PE device. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data with interconnected network nodes using a variety of different communication protocols, including, inter alia, TCP/IP, UDP, ATM, DSL, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as label-space/table 400. A router operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may comprise routing services 247, Multipoint-to-Multipoint Label Switched Path (MP2MP LSP) services/process 248, multicast forwarding process 244, Internet Group Management Protocol (IGMP) process 245, etc. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., OSPF and IS-IS), BGP, etc. These functions may be configured to manage a forwarding information database (not shown) containing, e.g., data used to make forwarding decisions. Routing services 247 may also perform functions related to virtual routing protocols, such as maintaining VRF instances (not shown) as will be understood by those skilled in the art.

In one embodiment, the routers described herein (e.g., PEs) may be IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop. The paths taken by packets that traverse the network in this manner are referred to as label switched paths (LSPs). A protocol that may be used to distribute the labels throughout the network, e.g., a label distribution protocol (LDP), particularly as used herein, is described in the above-incorporated Internet Draft by Minei et al., entitled *Label Distribution Protocol Extensions for Point-to-Multipoint and Multipoint-to-Multipoint Label Switched Paths*, and above-incorporated Internet Draft by Wijnands et al., entitled *Multicast Extensions for LDP*. Notably, where MPLS Traffic Engineering (TE) is used, TE-LSPs may be created that have guaranteed bandwidth under certain conditions, as will be understood by those skilled in the art.

Illustratively, the PE devices PE1-PE3 are configured as end nodes of an MP2MP LSP. As those skilled in the art will understand, the MP2MP LSP may traverse links of an underlying IP multicast tree between the end nodes PE1-PE3, e.g., calculated using conventional techniques (e.g., shortest path first, "SPF," etc.). Further, two illustrative multicast groups, G1 and G2, may be configured to utilize the MP2MP LSP. As used herein, for example, PE1 may be an ingress for a source (S1) for multicast groups G1 and G2, i.e., (S1,G1) and (S1,G2), PE2 may be an ingress for a source (S2) for the multicast groups, i.e., (S2,G1) and (S2,G2), and PE3 may be an ingress for a source (S3) for the multicast groups, i.e., (S3,G1) and (S3,G2). Notably, each PE device PE1-PE3 may also be configured as a receiving end node for the groups G1 and G2. Further, customer devices C1-C3, as mentioned above, may be a source or destination of IP multicast traffic streams (IP streams) that utilize the MP2MP LSP.

Figure 3:
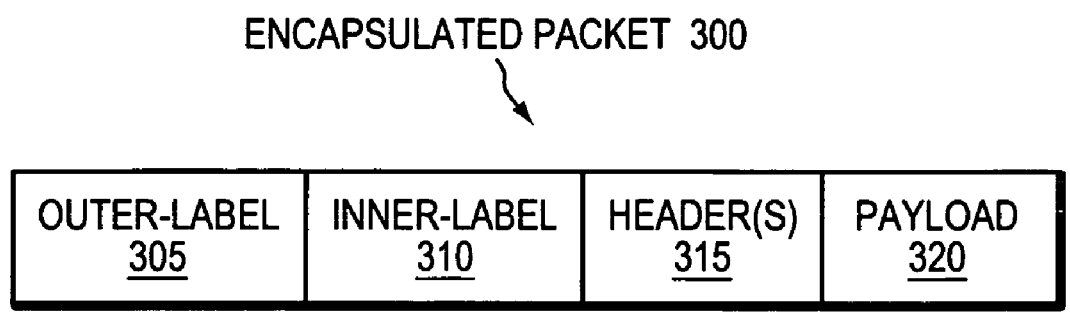
FIG. 3 is a schematic block diagram of an exemplary encapsulated packet that may be advantageously used with the present invention.

Briefly, FIG. 3 is a schematic block diagram of an exemplary encapsulated packet 300 that may be advantageously used with the present invention. Illustratively, packet 300 is shown as a high-level generic packet, and those skilled in the art will understand that packet 300 may comprise other fields accordingly. The packet 300 includes an outer-label 305 corresponding to the MP2MP LSP, an inner-label 310 defined and used in accordance with the present invention described below, as well as conventional headers 315 (e.g., TCP/IP, etc.) of the un-encapsulated portion of the packet 300 (e.g., for IP routing of the IP stream), and a payload field 320 that may be used to contain packet-specific information (e.g., the content of the IP stream), as will be understood by those skilled in the art.

MP2MP LSP services/process 248 contains computer executable instructions executed by processor 220 to perform functions provided by one or more multicast and/or LSP (tunneling/encapsulation) protocols. For instance, multicast forwarding process 244 may contain computer executable instructions executed by processor 220 to perform functions provided by one or more multicast protocols, such as Protocol Independent Multicast (PIM), PIM-Sparse Mode (PIM-SM), etc. These functions may be configured to cooperate with one or more routing protocols of routing services 247 that may be used to make routing and forwarding decisions. Also, IGMP process 245 may contain computer executable instructions executed by processor 220 to perform conventional IGMP functions described briefly above, as will be understood by those skilled in the art. Other processes that will further be understood by those skilled in the art to perform multicast and/or LSP protocols (e.g., RSVP, TE, etc., not shown) may also be contained within MP2MP LSP services/process 248, and may be used in accordance with the present invention.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

The present invention is directed to a technique for avoiding IP lookup with MP2MP LSPs in a computer network. According to the novel technique, end nodes of an MP2MP LSP determine a root node of the MP2MP LSP for a particular IP stream, e.g., based on a rendezvous point (RP) of the IP stream. The root node of the MP2MP LSP allocates an inner-label for the particular IP stream, and informs each of the end nodes of the inner-label for that stream. When any one of the end nodes thereafter sources traffic for the particular IP stream, the sourced traffic contains the allocated inner-label for the stream. Upon receiving the traffic for the particular IP stream, an end node may determine the IP stream to which the received traffic belongs based on the MP2MP LSP (e.g., indicated by an outer-label) and the inner-label, i.e., without performing an IP lookup operation.

Notably, each of the end nodes of the MP2MP LSP (PE1-PE3) determines the root of the MP2MP LSP, e.g., in a conventional manner. For example, the root (e.g., illustratively PE1) may be selected as the node corresponding to the RP of the underlying IP multicast tree, which, e.g., has been determined manually or dynamically (Auto-RP, BSR, etc.), as described above. In other words, the root may be the RP, or, illustratively, may be the node via which the RP is reachable. Those skilled in the art will understand various means for determining the root of the MP2MP LSP, and such means may be advantageously used with the present invention accordingly.

In accordance with the present invention, the root node of the MP2MP LSP (e.g., PE1) allocates an inner-label for each IP stream, i.e., a (*,G) group, that will utilize the MP2MP LSP. In one aspect of the present invention, the root node may advertise the inner-labels using a conventional PE-PE signaling protocol, such as Multiprotocol BGP (MP-BGP), PIM, etc., as will be understood by those skilled in the art. Notably, the advertisements may be sent at any time (e.g., periodic notifications/advertisements to a set of MP2MP LSP end nodes) or specifically in response to join requests from other end nodes (e.g., PE2 and PE3).

For instance, when configured to send advertisements in response to join requests, each potential source end point learns of the appropriate inner-label for a particular IP stream/group once a receiver attached to the source end point submits a request to join the particular IP stream/group. That is, upon receiving a join request, the root node may return an indication of which MP2MP LSP the requesting end node should join for the group and the inner-label corresponding to the group on that MP2MP LSP. The source end point may then re-use the inner-label learned from the root node when sourcing traffic for the particular IP stream/group itself.

For example, assume that a receiver C2 becomes active, and sends a join request to PE2 (its locally attached PE device) to join an IP stream of group G1, i.e., (*,G1). PE2 is thus triggered to communicate PE-PE signaling messages to the root node PE1 to transmit the join request accordingly (e.g., to the RP). PE1 may return an indication of which MP2MP LSP PE2 should join for the group G1 (e.g., MP2MP LSP "1" shown). In addition, in accordance with the present invention, PE1 may also identify the inner-label (e.g., "L100") corresponding to G1 on that MP2MP LSP. Now, when PE2 receives packets 300 having the corresponding outer- and inner-labels (described in detail below), PE2 may determine the appropriate group G1, regardless of the traffic's source.

In accordance with the present invention, should C2 begin sourcing traffic for G1, PE2 may encapsulate the traffic into sourced packets 300 onto the MP2MP LSP using the appropriate outer-label 305 (e.g., corresponding to MP2MP LSP "1") and the learned inner-label 310 ("L100") for group G1, i.e., the inner-label to be used by any source of group G1 traffic. The same procedure would apply for learning the inner-label for group G2 (e.g., "L200"), and for each other end node to learn the inner-labels. Those skilled in the art will understand that the outer-labels for MP2MP LSP "1" may differ at each end node PE1-PE3 since outer-labels are hop-by-hop assignments. Accordingly, where the present invention describes an "outer-label" for the MP2MP LSP, an indication of the appropriate MP2MP LSP (e.g., "1") is implied.

The learned outer-labels and inner-labels may be stored at each end node (e.g., PE devices PE1-PE3) in one or more label-spaces/tables accordingly. FIG. 4 is a schematic block diagram of an exemplary label-space/table 400 that may be advantageously used with the present invention. Label-spaces/tables 400 may be illustratively stored in memory 240, where each label-space/table 400 corresponds to a particular MP2MP LSP context 405 (e.g., corresponding to an outer-label, e.g., "1"). Label-space/table 400 includes one or more entries 420, each comprising a plurality of fields for storing an inner-label 410 and a corresponding IP stream (e.g., group, G) 415. In accordance with the present invention, the combination of the outer-label context 405 and inner-label 410 uniquely identifies a particular IP stream (group) 415 on all end nodes, regardless of source, i.e., (*,G) groups, thus allowing end nodes of an MP2MP LSP to distinguish received traffic without requiring an IP lookup, e.g., as described below.

The label-space/table 400 is illustratively maintained and managed by MP2MP LSP services/process 248. Accordingly, MP2MP LSP services/process 248 populates the label-space/table 400 with inner-labels and IP streams in accordance with the present invention. While individual label-spaces/tables 400 are shown for a plurality of MP2MP LSPs, the end node may alternatively maintain a single label-space/table 400 to be used for all MP2MP LSPs of the end node (e.g., PE1-PE3). For example, a separate field (e.g., a third column, not shown) may be used to identify the outer-label for each inner-label 410 and IP stream 415.

Notably, while the above technique describes dynamically learning the corresponding inner-labels, the present invention may equally be applied to inner-labels that are manually pre-configured, e.g., by a system administrator, such as for relatively simpler network configurations (e.g., having a small number of MP2MP LSPs and IP streams). Moreover, in accordance with the present invention, the root node (PE1) is not required to learn the inner-label through signaling, as it is the root node which has assigned the inner-labels accordingly.

In accordance with the present invention, packets 300 may be received at an end node (e.g., PE device, PE3) of the MP2MP LSP having the outer-label 305 and inner-label 310 (e.g., as sent from PE2 above). The receiving end node may then perform IP replication of the packet 300 (i.e., forwarding the packet to associated IP destination addresses, as will be understood by those skilled in the art) based on the outer- and inner-labels accordingly. In particular, the receiving end node examines the contents of the outer-label field 305 to determine a context (e.g., a label-space/table 400) of the inner-label 310. In other words, the end node may correlate the combined outer- and inner-labels with associated IP streams or groups, i.e., (*,G) groups, using an appropriate label-space/table 400. For example, a packet 300 may be received at an end node, e.g., PE2, having an outer-label 305 of "1" and an inner-label 310 of "L100." According to the present invention, the packet 300 is associated with IP stream G1, i.e., (*,G1), based on the entry 420 corresponding to "L100" within the label-space/table 400 for MP2MP LSP "1." Alternatively, if the inner-label 310 identified "L200," the packet 300 would be associated with IP stream G2, i.e., (*,G2), accordingly.

Because each end node PE1-PE3 of the MP2MP LSP will have configured a label-space/table 400 with the same outer- and inner-label correlation in accordance with the present invention, each end node may determine the appropriate IP stream regardless of the source of the stream, and without having to perform an IP lookup. That is, an outer-label corresponding to an MP2MP LSP and a particular inner-label will correspond to the same particular IP stream, i.e., (*,G) group, at each receiving end node of the network.

Notably, in the event the inner-labels are not learned prior to receiving join requests as described above (e.g., advertised periodically, or once the inner-label is determined at the root node), there may be circumstances that cause an end node of the MP2MP LSP to source traffic for a particular IP stream without an inner-label (e.g., where the source has not received a join request to learn the inner-label from the root node). In such a case, the source end node simply does not include the inner-label, and any receiving end node may perform an IP lookup in a conventional manner. For instance, the receiving end node may be required to use a destination IP address contained within the header 315 of packet 300 to determine (through IP lookup) to which IP stream the packet belongs.

Those skilled in the art will understand from the present invention that once each source end node of an IP stream has learned the inner-label for the stream, no other (so configured) receiving end node need perform an IP lookup for that IP stream. In particular, once all sources and receivers are active (i.e., have sourced and/or requested to receive IP stream traffic), all traffic (packets 300) which is sent over the MP2MP LSP by a source (PE device) is encapsulated with appropriate inner-labels and an MP2MP LSP outer-label (which, notably, may change hop-by-hop within the network). Moreover, those skilled in the art will also understand that the present invention does not impact operation of the P devices (core devices) of the provider network 110, i.e., intermediate devices along the MP2MP LSP, since the intermediate devices are only concerned with the conventional outer-labels 305 of the transmitted packets 300.

Figure 5:
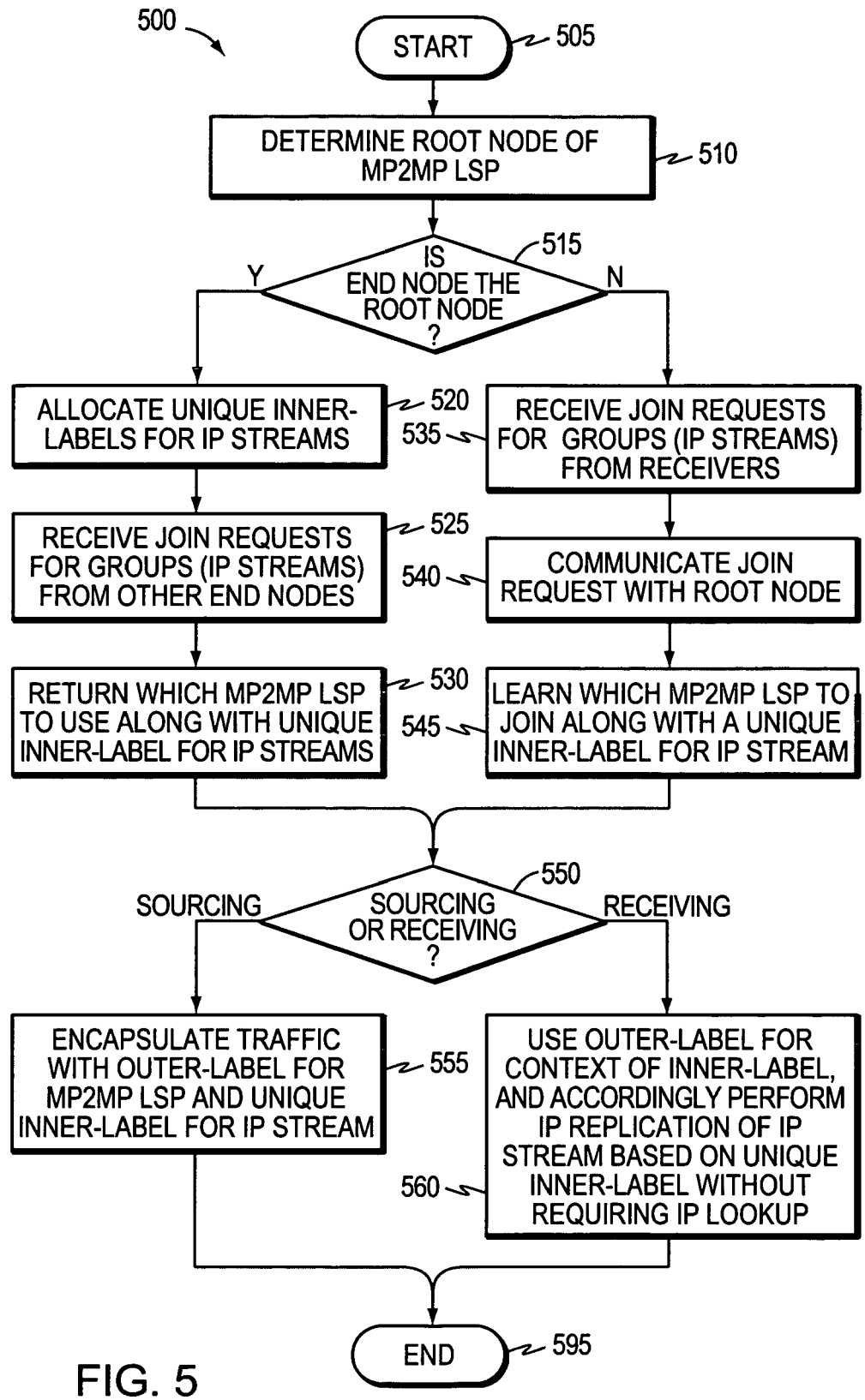
FIG. 5 is a flowchart illustrating a procedure for avoiding IP lookup with MP2MP LSPs in a computer network in accordance with the present invention.

FIG. 5 is a flowchart illustrating a procedure for avoiding IP lookup with MP2MP LSPs in a computer network in accordance with the present invention. The procedure 500 starts at step 505, and continues to step 510, where the end nodes of an MP2MP LSP (e.g., PE1, PE2, and PE3) determine a root node (e.g., PE1) of the MP2MP LSP, as described above. If the end node is itself the root node at step 515, the root node allocates unique inner-labels for each IP stream for which the node is the root. For instance, the root node (PE1) may allocate an inner-label of "L100" for G1 and "L200" for G2, as described above. Upon receiving a join request in step 525 for groups (IP streams) from other end nodes (e.g., PE2 and/or PE3), the root node returns an indication of which MP2MP LSP to use for the IP streams in step 530, as well as the unique inner-label allocated for the particular IP streams (e.g., L100 for G1 requests, L200 for G2 requests).

If, on the other hand, the end node is not the root node at step 515 (e.g., PE2 and PE3), the end node may receive join requests for groups (IP streams) from one or more attached receivers (e.g., R2, R3, etc.) at step 535. At step 540, the end node communicates the join request to the root node (PE1), as described above. Based on that communication, the end node learns which MP2MP LSP to join along with a unique inner-label for the requested IP stream (e.g., L100, L200, etc.) in step 545. Notably, where pre-configuration is applied to the end nodes to learn the inner-labels in step 545, steps 535 and 540 may not be required to initiate the learning of inner-labels, as described above.

Each of the end nodes of the MP2MP LSP (PE1-PE3) may then either source traffic for the IP stream or receive traffic from the IP stream in step 550. When sourcing traffic onto the MP2MP LSP, the end node encapsulates the traffic (in packets 300) with the appropriate outer-label (305) for the MP2MP LSP and the unique inner-label (310) for the IP stream in step 555. When receiving traffic in step 560, the end node extracts the outer-label (305) of the traffic (e.g., of the packet 300) to determine the context of the inner-label (310), such as to which table (label-space) 400 the inner-label applies. Also in step 560, the end node may accordingly perform IP replication of the IP stream based on the unique inner-label without IP lookup operations. Notably, as described above, if a source end node has not yet learned the inner-label for a particular IP stream, the inner-label may not be included within the traffic, and the receiving end node may perform IP lookup operations until the inner-label is included. The procedure 500 ends in step 595.

Advantageously, the novel technique avoids IP lookup with MP2MP LSPs in a computer network. By ensuring that each possible source node of the IP stream on the MP2MP LSP utilizes the same inner-label, the novel technique allows the receiving end nodes to determine the IP stream to which the received traffic belongs based on the unique inner-label for that LSP (i.e., regardless of the source). In particular, the present invention extends the concept of upstream-allocated inner-labels for point-to-multipoint (P2MP) LSPs for use with MP2MP LSPs by creating a mechanism through which all source nodes share the same unique inner-label for the IP stream on the MP2MP LSP, which is known by all the receiving end nodes. Further, the dynamic nature of the novel technique alleviates the need for cumbersome manual configuration.

While there has been shown and described an illustrative embodiment that avoids IP lookup with MP2MP LSPs in a computer network, it is to be understood that various other adaptations and modifications may be made within the spirit and scope of the present invention. For example, the invention has been shown and described herein for use with MP2MP LSPs. However, the invention in its broader sense is not so limited, and may, in fact, be used with root and end nodes of P2MP LSPs and multipoint-to-point (MP2P) LSPs, as will be understood by those skilled in the art. In other words, root and end nodes of LSPs need not distinguish between MP2MP, P2MP, or MP2P LSPs, but may utilize the techniques described herein for the present invention regardless of the type of LSP. Further, while the LSPs as described herein refer particularly to MPLS LSPs, those skilled in the art will understand that any type of LSP or other packet encapsulation method may be utilized in accordance with the present invention, such as, e.g., Generic Routing Encapsulation (GRE) tunnels, IP Security (IPSec) tunnels, Layer-2 Tunneling Protocol (L2TP) tunnels, etc.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A source end node for use with avoiding Internet Protocol (IP) lookup with Multipoint-to-Multipoint (MP2MP) Label Switched Paths (LSPs) in a computer network, the source end node comprising:
   one or more network interfaces;
   a processor coupled to the one or more network interfaces and adapted to execute software processes; and
   a memory adapted to store an MP2MP LSP process executable by the processor, the MP2MP LSP process configured to: i) receive a join request from a client node coupled to the source end node via one of the network interfaces, the join request indicating a desire to join a particular IP stream of a plurality of IP streams; ii) in response to receipt from the client node of the join request indicating the desire to join the particular IP stream, communicate with a root node of a MP2MP LSP that carries traffic for the plurality of IP streams including the particular IP stream, to learn an inner-label uniquely identifying the particular IP stream, the same inner-label for use by all of a plurality of source end nodes of the MP2MP LSP for the particular IP stream in the computer network, and iii) source traffic for the particular IP stream onto the MP2MP LSP, the MP2MP LSP process to include in the sourced traffic the inner-label uniquely identifying the particular IP stream.

2. The source end node as in claim 1, wherein the MP2MP LSP process is further configured to:
   receive traffic an IP stream of the plurality of IP streams; and determine that the IP stream, to which the received traffic belongs, is the particular IP stream based on the MP2MP LSP and the inner-label.

3. The source end node as in claim 2, wherein the MP2MP LSP process is further configured to:
   perform IP replication for the received traffic to one or more client nodes based on the MP2MP LSP and the inner-label.

4. The source end node as in claim 2, wherein the MP2MP LSP process is further configured to:
   determine the MP2MP LSP by an outer-label.

5. The source end node as in claim 4, wherein the MP2MP LSP process is further configured to:
   utilize the MP2MP LSP outer-label to identify a label-space into which the inner-label is referenced to determine which IP stream the received traffic belongs.

6. The source end node as in claim 1, wherein the MP2MP LSP process is further configured to:
   determine the root node of the MP2MP LSP for the particular IP stream.

7. The source end node as in claim 6, wherein the root node of the MP2MP LSP corresponds to a rendezvous point (RP) for the particular IP stream.

8. The source end node as in claim 1, wherein the MP2MP LSP process is further configured to:
   learn the inner-label for the particular IP stream through at least one advertisement.

9. The source end node as in claim 8, wherein the advertisement is selected from a group comprising: a Border Gateway Protocol (BGP) advertisement and a Protocol Independent Multicast (PIM) message.

10. The source end node as in claim 1, wherein the MP2MP LSP is embodied as a point-to-multipoint (P2MP) LSP.

11. The source end node as in claim 1, wherein the MP2MP LSP is embodied as a multipoint-to-point (MP2P) LSP.

12. A method for avoiding Internet Protocol (IP) lookup with Multipoint-to-Multipoint (MP2MP) Label Switched Paths (LSPs) in a computer network, the method comprising:
   receiving, at a source end node, a join request from a client node coupled to the source end node, the join request indicating a desire to join a particular IP stream of a plurality of IP streams;
   in response to receipt at the source end node of the join request from the client node indicating the desire to join the particular IP stream, communicating from the source end node to a root node of a MP2MP LSP that carries traffic for the plurality of IP streams including the particular IP stream, to learn an inner-label uniquely identifying the particular IP stream, the same inner-label for use by all of a plurality of source end nodes of the MP2MP LSP for the particular IP stream in the computer network; and
   sourcing traffic for the particular IP stream from the source end node onto the MP2MP LSP, the source end node to include in the sourced traffic the allocated inner-label that uniquely identifies the particular IP stream.

13. The method as in claim 12, further comprising:
   receiving traffic for an IP stream of the plurality of IP streams at a receiving end node; and determining at the receiving end node that the IP stream, to which the received traffic belongs, is the particular IP stream based on the MP2MP LSP and the inner-label.

14. The method as in claim 13, further comprising:
   determining the MP2MP LSP by an outer-label.

15. A non-transitory computer readable medium containing executable program instructions for avoiding Internet Protocol (IP) lookup with Multipoint-to-Multipoint (MP2MP) Label Switched Paths (LSPs) in a computer network, the executable program instructions comprising program instructions adapted to:
   receive a join request from a client node, the join request indicating a desire to join a particular IP stream of a plurality of IP streams;
   learn an inner-label that uniquely identifies the particular IP stream from a root node of the MP2MP LSP for the particular IP stream, in response to receipt from the client node of the join request indicating the desire to join the particular IP stream, the same inner-label for use by all of a plurality of source end nodes of the MP2MP LSP for the particular IP stream in the computer network; and
   source traffic for the particular IP stream onto the MP2MP LSP and include in the sourced traffic the inner-label that uniquely identifies the particular IP stream.

16. The non-transitory computer readable medium as in claim 15, the program instruction further adapted to:
   receive traffic for an IP stream of the plurality of IP streams; and determine that the IP stream, to which the received traffic belongs, is the particular IP stream based on the MP2MP LSP and the inner-label.

17. An apparatus for avoiding Internet Protocol (IP) lookup with Multipoint-to-Multipoint (MP2MP) Label Switched Paths (LSPs) in a computer network, the apparatus comprising:
   means for receiving a join request from a client node, the join request indicating a desire to join a particular IP stream;
   means for learning an inner-label that uniquely identifies the particular IP stream from a root node of the MP2MP LSP for the particular IP stream, in response to receipt from the client node of the join request indicating the desire to join the particular IP stream, the same inner-label for use by all of a plurality of source end nodes of the MP2MP LSP for the particular IP stream in the computer network; and means for sourcing traffic that identifies the particular IP stream onto the MP2MP LSP, the means for sourcing to include in the sourced traffic the inner-label that uniquely identifies the particular IP stream.

18. The apparatus as in claim 17, further comprising:

means for receiving traffic for an IP stream; and means for determining that the IP stream, to which the received traffic belongs, is the particular IP stream based on the MP2MP LSP and the inner-label.

19. A system for use with avoiding Internet Protocol (IP) lookup with Multipoint-to-Multipoint (MP2MP) Label Switched Paths (LSPs) in a computer network, the system comprising:

a root node of the MP2MP LSP for a particular IP stream configured to allocate an inner-label that uniquely identifies the particular IP stream, the same inner-label allocated for use by all of a plurality of source end nodes of the MP2MP LSP for the particular IP stream in the computer network; and a source end node configured to i) receive a join request from a client node coupled to the source end node via one of the network interfaces, the join request indicating a desire to join the particular IP stream; ii) in response to receipt from the client node of the join request indicating the desire to join the particular IP stream, communicate with the root node to learn the inner-label that uniquely identifies the particular IP stream from the root node, and ii) source traffic for the particular IP stream onto the MP2MP LSP, the source end node to include in the sourced traffic the allocated inner-label that uniquely identifies the particular IP stream.

20. The system as in claim 19, further comprising:

a receiving end node configured to i) learn the inner-label that uniquely identifies an IP stream from the root node, ii) receive traffic for the IP stream, and iii) determine that the IP stream, to which the received traffic belongs, is the particular IP stream based on the MP2MP LSP and the inner-label.

* * * * *